US009495962B2

(12) United States Patent
Govrin et al.

(10) Patent No.: US 9,495,962 B2
(45) Date of Patent: Nov. 15, 2016

(54) SYSTEM AND METHOD FOR EVALUATING INTENT OF A HUMAN PARTNER TO A DIALOGUE BETWEEN HUMAN USER AND COMPUTERIZED SYSTEM

(71) Applicant: Personetics Technologies Ltd., Tel Aviv (IL)

(72) Inventors: David D. Govrin, Herzeliya (IL); David Sosna, Scarsdale, NY (US);
(Continued)

(73) Assignee: PERSONETICS TECHNOLOGIES LTD., Tel Aviv (IL)

(*) Notice: Subject to any disclaimer, the term of this patent is extended or adjusted under 35 U.S.C. 154(b) by 130 days.

(21) Appl. No.: 14/345,811

(22) PCT Filed: Sep. 19, 2012

(86) PCT No.: PCT/IL2012/050372
§ 371 (c)(1),
(2) Date: Mar. 19, 2014

(87) PCT Pub. No.: WO2013/042117
PCT Pub. Date: Mar. 28, 2013

(65) Prior Publication Data
US 2014/0222433 A1    Aug. 7, 2014

Related U.S. Application Data

(60) Provisional application No. 61/536,142, filed on Sep. 19, 2011.

(51) Int. Cl.
*G10L 15/22* (2006.01)
*G06N 5/04* (2006.01)
(Continued)

(52) U.S. Cl.
CPC ............ *G10L 15/22* (2013.01); *G06F 17/20* (2013.01); *G06N 5/02* (2013.01); *G06N 5/04* (2013.01);
(Continued)

(58) Field of Classification Search
CPC ............ G10L 15/22; G10L 2015/221; G10L 2015/225; G10L 2015/223
See application file for complete search history.

(56) References Cited

U.S. PATENT DOCUMENTS 5,899,972 A * 5/1999 Miyazawa ............ G10L 15/22
704/236
6,021,403 A * 2/2000 Horvitz ................. G06F 9/4446
706/11
(Continued)

OTHER PUBLICATIONS

International Search Report and Written Opinion dated Feb. 28, 2013, from the corresponding PCT/IL12/50372.
(Continued)

*Primary Examiner* — Douglas Godbold
(74) *Attorney, Agent, or Firm* — Oliff PLC

(57) ABSTRACT

A system and method for assigning relative scores to various possible intents on the part of a user approaching a virtual agent, the method comprising predicting priority topics, including gathering first data and employing the first data to discern and seek user confirmation of at least one possible intent on the part of the user; and subsequent to receipt of the confirmation, gathering second data and employing the second data to provide service to the user to suit the user's confirmed intent.

24 Claims, 8 Drawing Sheets

(72) Inventors: Ido Ophir, Tenafly, NJ (US); Dan Vatnik, Tel-Aviv (IL)

(51) Int. Cl.
*G10L 13/08* (2013.01)
*G06N 5/02* (2006.01)
*G06Q 40/02* (2012.01)
*G06F 17/20* (2006.01)

(52) U.S. Cl.
CPC ............... *G06Q 40/02* (2013.01); *G10L 13/08* (2013.01); *G10L 2013/083* (2013.01)

(56) References Cited

U.S. PATENT DOCUMENTS

| | | | |
|---|---|---|---|
| 6,505,155 B1* | 1/2003 | Vanbuskirk | G10L 15/22 704/246 |
| 6,711,585 B1 | 3/2004 | Copperman | |
| 6,766,320 B1 | 7/2004 | Wang | |
| 6,947,923 B2* | 9/2005 | Cha | G06F 17/30684 |
| 7,739,215 B2 | 6/2010 | Horvitz | |
| 8,938,394 B1* | 1/2015 | Faaborg | G06F 3/167 704/270 |
| 2001/0047265 A1* | 11/2001 | Sepe, Jr. | G10L 15/22 704/275 |
| 2001/0049688 A1 | 12/2001 | Fratkina | |
| 2002/0133392 A1 | 9/2002 | Angel | |
| 2003/0019627 A1 | 1/2003 | Qu et al. | |
| 2003/0233230 A1* | 12/2003 | Ammicht | G10L 15/183 704/235 |
| 2005/0228668 A1 | 10/2005 | Wilson | |
| 2006/0074670 A1* | 4/2006 | Weng | G10L 15/22 704/257 |
| 2006/0167856 A1* | 7/2006 | Angele | G06F 17/30545 |
| 2006/0285657 A1* | 12/2006 | Lippke | H04M 3/493 379/67.1 |
| 2007/0033038 A1* | 2/2007 | Strong | G10L 15/1822 704/251 |
| 2007/0078886 A1* | 4/2007 | Rivette | G06F 17/30011 |
| 2007/0239637 A1* | 10/2007 | Paek | G06F 17/276 706/20 |
| 2008/0097748 A1 | 4/2008 | Haley | |
| 2010/0023320 A1* | 1/2010 | Di Cristo | G06F 17/273 704/9 |
| 2010/0220745 A1 | 9/2010 | Lauwers et al. | |
| 2010/0312547 A1* | 12/2010 | Van Os | G06F 3/167 704/9 |
| 2012/0016678 A1 | 1/2012 | Gruber et al. | |
| 2014/0222433 A1* | 8/2014 | Govrin | G06Q 40/02 704/260 |

OTHER PUBLICATIONS

"Apple introduces us to Siri the Killer Patent", Patently Apple, https://web.archive.org/web/20120501071547/http://www.patentlyapple.com/patently-apple/2012/01/apple-introduces-us-to-siri-the-killer-patent.html, May 1, 2012.
"Free variables and bound variables", from Wikipedia, the free encyclopedia, https://en.wikipedia.org/w/index.php?title=Free_variables_and_bound_variables&oldid-510576259, Sep. 3, 2012.
"Drools", from Wikipedia, the free encyclopedia, https://en.wikipedia.org/w/index.php? title=Drools&oldid=507822378, Aug. 17, 2012.
"Rete algorithm", from Wikipedia, the free encyclopedia, https://en.wikipedia.org/w/index.php?title=Rete_algorithm &oldid=502977832, Jul. 18, 2012.
"Predictive analytics", from Wikipedia, the free encyclopedia, https://en.wikipedia.org/w/index.php?title=Predictive_analytics &oldid=513163651, Sep. 17, 2012.
"Closure (computer programming)", from Wikipedia, the free encyclopedia, https://en.wikipedia.org/w/index.php?title=Closure_(computer_programming)&oldid=512390948, Sep. 14, 2012.
"Spectral graph theory", from Wikipedia, the free encyclopedia, https://en.wikipedia.org/w/index.php?title=Spectral_graph_theory &oldid=505685173, Aug. 4, 2012.
U.S. Office Action dated Nov. 23, 2015 from corresponding U.S. Appl. No. 14/345,771.

\* cited by examiner

US 9,495,962 B2

SYSTEM AND METHOD FOR EVALUATING INTENT OF A HUMAN PARTNER TO A DIALOGUE BETWEEN HUMAN USER AND COMPUTERIZED SYSTEM

REFERENCE TO CO-PENDING APPLICATIONS

Priority is claimed from U.S. Provisional Patent Application No. 61/536,142, entitled "Method and system for automated-context-aware-dialogue with human users" and filed Sep. 19, 2011.

FIELD OF THIS DISCLOSURE

The present invention relates generally to computerized systems and more particularly to computerized systems conducting dialogue with a human user.

BACKGROUND FOR THIS DISCLOSURE

Systems for conducting dialog between a human user and a computerized system are known.

Published US Patent Application 20120016678, assigned to Apple, entitled Intelligent Automated Assistant, published Jan. 19, 2012, and was filed Jan. 10, 2011. This application describes an intelligent automated assistant system which "engages with the user in an integrated, conversational manner using natural language dialog, and invokes external services when appropriate to obtain information or perform various actions. The system may be implemented using any of a number of different platforms, such as the web, email, smartphone, and the like, or any combination thereof. In one embodiment, the system is based on sets of interrelated domains and tasks, and employs additional functionally powered by external services with which the system can interact."

Variable binding is known and is described e.g. in Wikipedia, in an entry entitled "Free variables and bound variables".

Wikipedia describes that "Drools is a business rule management system (BRMS) with a forward chaining inference based rules engine, more correctly known as a production rule system, using an enhanced implementation of the Rete algorithm."

According to Wikipedia: "The Rete algorithm is an efficient pattern matching algorithm for implementing production rule systems . . . . Rete has become the basis for many popular rule engines and expert system shells, including Tibco Business Events, CLIPS, Jess, Drools, JRules, OPSJ, Blaze Advisor, BizTalk Rules Engine and Soar . . . .

"A Rete-based expert system builds a network of nodes, where each node (except the root) corresponds to a pattern occurring in the left-hand-side (the condition part) of a rule. The path from the root node to a leaf node defines a complete rule left-hand-side. Each node has a memory of facts which satisfy that pattern. This structure is essentially a generalized trie. As new facts are asserted or modified, they propagate along the network, causing nodes to be annotated when that fact matches that pattern. When a fact or combination of facts causes all of the patterns for a given rule to be satisfied, a leaf node is reached and the corresponding rule is triggered.

"The Rete algorithm provides a generalized logical description of an implementation of functionality responsible for matching data tuples ("facts") against productions ("rules") in a pattern-matching production system (a category of rule engine). A production consists of one or more conditions and a set of actions which may be undertaken for each complete set of facts that match the conditions. Conditions test fact attributes, including fact type specifiers/ identifiers. The Rete algorithm exhibits the following major characteristics:

"It reduces or eliminates certain types of redundancy through the use of node sharing.

"It stores partial matches when performing joins between different fact types. This, in turn, allows production systems to avoid complete re-evaluation of all facts each time changes are made to the production system's working memory. Instead, the production system needs only to evaluate the changes (deltas) to working memory.

"It allows for efficient removal of memory elements when facts are retracted from working memory.

"The Rete algorithm is widely used to implement matching functionality within pattern-matching engines that exploit a match-resolve-act cycle to support forward chaining and inferencing.

"Retes are directed acyclic graphs that represent higher-level rule sets. They are generally represented at run-time using a network of in-memory objects. These networks match rule conditions (patterns) to facts (relational data tuples). Rete networks act as a type of relational query processor, performing projections, selections and joins conditionally on arbitrary numbers of data tuples.

"Productions (rules) are typically captured and defined by analysts and developers using some high-level rules language. They are collected into rule sets which are then translated, often at run time, into an executable Rete.

"When facts are "asserted" to working memory, the engine creates working memory elements (WMEs) for each fact. Facts are n-tuples, and may therefore contain an arbitrary number of data items. Each WME may hold an entire n-tuple, or, alternatively, each fact may be represented by a set of WMEs where each WME contains a fixed-length tuple. In this case, tuples are typically triplets (3-tuples).

"Each WME enters the Rete network at a single root node. The root node passes each WME on to its child nodes, and each WME may then be propagated through the network, possibly being stored in intermediate memories, until it arrives at a terminal node.

"The "left" (alpha) side of the node graph forms a discrimination network responsible for selecting individual WMEs based on simple conditional tests which match WME attributes against constant values. Nodes in the discrimination network may also perform tests that compare two or more attributes of the same WME. If a WME is successfully matched against the conditions represented by one node, it is passed to the next node. In most engines, the immediate child nodes of the root node are used to test the entity identifier or fact type of each WME. Hence, all the WMEs which represent the same entity type typically traverse a given branch of nodes in the discrimination network.

"Within the discrimination network, each branch of alpha nodes (also called 1-input nodes) terminates at a memory, called an alpha memory. These memories store collections of WMEs that match each condition in each node in a given node branch. WMEs that fail to match at least one condition in a branch are not materialised within the corresponding alpha memory. Alpha node branches may fork in order to minimise condition redundancy.

"A possible variation is to introduce additional memories for each intermediate node in the discrimination network. This increases the overhead of the Rete, but may have advantages in situations where rules are dynamically added to or removed from the Rete, making it easier to vary the topography of the discrimination network dynamically.

"An alternative implementation is described by Doorenbos. In this case, the discrimination network is replaced by a set of memories and an index. The index may be implemented using a hash table. Each memory holds WMEs that match a single conditional pattern, and the index is used to reference memories by their pattern. This approach is only practical when WMEs represent fixed-length tuples, and the length of each tuple is short (e.g., 3-tuples). In addition, the approach only applies to conditional patterns that perform equality tests against constant values. When a WME enters the Rete, the index is used to locate a set of memories whose conditional pattern matches the WME attributes, and the WME is then added directly to each of these memories. In itself, this implementation contains no 1-input nodes. However, in order to implement non-equality tests, the Rete may contain additional 1-input node networks through which WMEs are passed before being placed in a memory. Alternatively, non-equality tests may be performed in the beta network described below.

"The "right" (beta) side of the graph chiefly performs joins between different WMEs. It is optional, and is only included if required. It consists of 2-input nodes where each node has a "left" and a "right" input. Each beta node sends its output to a beta memory.

"Beta nodes process tokens. A token is a unit of storage within a memory and also a unit of exchange between memories and nodes. In many implementations, tokens are introduced within alpha memories where they are used to hold single WMEs. These tokens are then passed to the beta network.

"Each beta node performs its work and, as a result, may create new tokens to hold a list of WMEs representing a partial match. These extended tokens are then stored in beta memories, and passed to subsequent beta nodes. In this case, the beta nodes typically pass lists of WMEs through the beta network by copying existing WME lists from each received token into new tokens and then adding a further WMEs to the lists as a result of performing a join or some other action. The new tokens are then stored in the output memory.

"A common variation is to build linked lists of tokens where each token holds a single WME. In this case, lists of WMEs for a partial match are represented by the linked list of tokens. This approach may be better because it eliminates the need to copy lists of WMEs from one token to another. Instead, a beta node needs only to create a new token to hold a WME it wishes to join to the partial match list, and then link the new token to a parent token stored in the input beta memory. The new token now forms the head of the token list, and is stored in the output beta memory.

"In descriptions of Rete, it is common to refer to token passing within the beta network . . . [but instead one can] describe data propagation in terms of WME lists, rather than tokens, in recognition of different implementation options and the underlying purpose and use of tokens. As any one WME list passes through the beta network, new WMEs may be added to it, and the list may be stored in beta memories. A WME list in a beta memory represents a partial match for the conditions in a given production.

"WME lists that reach the end of a branch of beta nodes represent a complete match for a single production, and are passed to terminal nodes. These nodes are sometimes called p-nodes, where "p" stands for production. Each terminal node represents a single production, and each WME list that arrives at a terminal node represents a complete set of matching WMEs for the conditions in that production. For each WME list it receives, a production node will "activate" a new production instance on the "agenda". Agendas are typically implemented as prioritised queues.

"Beta nodes typically perform joins between WME lists stored in beta memories and individual WMEs stored in alpha memories. Each beta node is associated with two input memories. An alpha memory holds WM and performs "right" activations on the beta node each time it stores a new WME. A beta memory holds WME lists and performs "left" activations on the beta node each time it stores a new WME list. When a join node is right-activated, it compares one or more attributes of the newly stored WME from its input alpha memory against given attributes of specific WMEs in each WME list contained in the input beta memory. When a join node is left-activated it traverses a single newly stored WME list in the beta memory, retrieving specific attribute values of given WMEs. It compares these values with attribute values of each WME in the alpha memory.

"Each beta node outputs WME lists which are either stored in a beta memory or sent directly to a terminal node. WME lists are stored in beta memories whenever the engine will perform additional left activations on subsequent beta nodes.

"Logically, a beta node at the head of a branch of beta nodes is a special case because it takes no input from any beta memory higher in the network. Different engines handle this issue in different ways. Some engines use specialised adapter nodes to connect alpha memories to the left input of beta nodes. Other engines allow beta nodes to take input directly from two alpha memories, treating one as a "left" input and the other as a "right" input. In both cases, "head" beta nodes take their input from two alpha memories.

"In order to eliminate node redundancies, any one alpha or beta memory may be used to perform activations on multiple beta nodes. As well as join nodes, the beta network may contain additional node types, some of which are described below. If a Rete contains no beta network, alpha nodes feed tokens, each containing a single WME, directly to p-nodes. In this case, there may be no need to store WMEs in alpha memories.

"Conflict resolution: During any one match-resolve-act cycle, the engine will find all possible matches for the facts currently asserted to working memory. Once all the current matches have been found, and corresponding production instances have been activated on the agenda, the engine determines an order in which the production instances may be "fired". This is termed conflict resolution, and the list of activated production instances is termed the conflict set. The order may be based on rule priority (salience), rule order, the time at which facts contained in each instance were asserted to the working memory, the complexity of each production, or some other criteria. Many engines allow rule developers to select between different conflict resolution strategies or to chain a selection of multiple strategies. Conflict resolution is not defined as part of the Rete algorithm, but is used alongside the algorithm.

"Production execution: Having performed conflict resolution, the engine now "fires" the first production instance, executing a list of actions associated with the production. The actions act on the data represented by the production instance's WME list.

"By default, the engine will continue to fire each production instance in order until all production instances have been fired. Each production instance will fire only once, at most, during any one match-resolve-act cycle. This characteristic is termed refraction. However, the sequence of production instance firings may be interrupted at any stage by performing changes to the working memory. Rule actions can contain instructions to assert or retract WMEs from the working memory of the engine. Each time any single production instance performs one or more such changes, the engine immediately enters a new match-resolve-act cycle. This includes "updates" to WMEs currently in the working memory. Updates are represented by retracting and then re-asserting the WME. The engine undertakes matching of the changed data which, in turn, may result in changes to the list of production instances on the agenda. Hence, after the actions for any one specific production instance have been executed, previously activated instances may have been de-activated and removed from the agenda, and new instances may have been activated.

"As part of the new match-resolve-act cycle, the engine performs conflict resolution on the agenda and then executes the current first instance. The engine continues to fire production instances, and to enter new match-resolve-act cycles, until no further production instances exist on the agenda. At this point the rule engine is deemed to have completed its work, and halts.

"It is possible for the engine to enter into never-ending loops in which the agenda never reaches the empty state. For this reason, most engines support explicit "halt" verbs that can be invoked from production action lists. They may also provide automatic loop detection in which never-ending loops are automatically halted after a given number of iterations. Some engines support a model in which, instead of halting when the agenda is empty, the engine enters a wait state until new facts are asserted externally . . . .

"Existential and universal quantifications: Conditional tests are most commonly used to perform selections and joins on individual tuples. However, by implementing additional beta node types, it is possible for Rete networks to perform quantifications. Existential quantification involves testing for the existence of at least one set of matching WMEs in working memory. Universal quantification involves testing that an entire set of WMEs in working memory meets a given condition. A variation of universal quantification might test that a given number of WMEs, drawn from a set of WMEs, meets given criteria. This might be in terms of testing for either an exact number or a minimum number of matches.

"Quantification is not universally implemented in Rete engines, and, where it is supported, several variations exist. A variant of existential quantification referred to as negation is widely, though not universally, supported, and is described in seminal documents. Existentially negated conditions and conjunctions involve the use of specialised beta nodes that test for non-existence of matching WMEs or sets of WMEs. These nodes propagate WME lists only when no match is found. The exact implementation of negation varies. In one approach, the node maintains a simple count on each WME list it receives from its left input. The count specifies the number of matches found with WMEs received from the right input. The node only propagates WME lists whose count is zero. In another approach, the node maintains an additional memory on each WME list received from the left input. These memories are a form of beta memory, and store WME lists for each match with WMEs received on the right input. If a WME list does not have any WME lists in its memory, it is propagated down the network. In this approach, negation nodes generally activate further beta nodes directly, rather than storing their output in an additional beta memory. Negation nodes provide a form of 'negation as failure'.

"When changes are made to working memory, a WME list that previously matched no WMEs may now match newly asserted WMEs. In this case, the propagated WME list and all its extended copies need to be retracted from beta memories further down the network. The second approach described above is often used to support efficient mechanisms for removal of WME lists. When WME lists are removed, any corresponding production instances are de-activated and removed from the agenda.

"Existential quantification can be performed by combining two negation beta nodes. This represents the semantics of double negation (e.g., "If NOT NOT any matching WMEs, then . . . "). This is a common approach taken by several production systems.

"Memory indexing: The Rete algorithm does not mandate any specific approach to indexing the working memory. However, most modern production systems provide indexing mechanisms. In some cases, only beta memories are indexed, whilst in others, indexing is used for both alpha and beta memories. A good indexing strategy is a major factor in deciding the overall performance of a production system, especially when executing rule sets that result in highly combinatorial pattern matching (i.e., intensive use of beta join nodes), or, for some engines, when executing rules sets that perform a significant number of WME retractions during multiple match-resolve-act cycles. Memories are often implemented using combinations of hash tables, and hash values are used to perform conditional joins on subsets of WME lists and WMEs, rather than on the entire contents of memories. This, in turn, often significantly reduces the number of evaluations performed by the Rete network.

"Removal of WMEs and WME lists: When a WME is retracted from working memory, it must be removed from every alpha memory in which it is stored. In addition, WME lists that contain the WME must be removed from beta memories, and activated production instances for these WME lists must be de-activated and removed from the agenda. Several implementation variations exist, including tree-based and rematch-based removal. Memory indexing may be used in some cases to optimise removal.

"Handling ORed conditions: When defining productions in a rule set, it is common to allow conditions to be grouped using an OR connective. In many production systems, this is handled by interpreting a single production containing multiple ORed patterns as the equivalent of multiple productions. The resulting Rete network contains sets of terminal nodes which, together, represent single productions. This approach disallows any form of short-circuiting of the ORed conditions. It can also, in some cases, lead to duplicate production instances being activated on the agenda where the same set of WMEs match multiple internal productions. Some engines provide agenda de-duplication in order to handle this issue.

"The following diagram (FIG. 1a of the present specification) illustrates the basic Rete topography, and shows the associations between different node types and memories.

"Most implementations use type nodes to perform the first level of selection on n-tuple working memory elements. Type nodes can be considered as specialized select nodes. They discriminate between different tuple relation types.

"The diagram does not illustrate the use of specialized nodes types such as negated conjunction nodes. Some engines implement several different node specialisations in order to extend functionality and maximise optimisation.

"The diagram provides a logical view of the Rete. Implementations may differ in physical detail. In particular, the diagram shows dummy inputs providing right activations at the head of beta node branches. Engines may implement other approaches, such as adapters that allow alpha memories to perform right activations directly.

"The diagram does not illustrate all node-sharing possibilities.

"Although not defined by the Rete algorithm, some engines provide extended functionality to support greater control of truth maintenance. For example, when a match is found for one production, this may result in the assertion of new WMEs which, in turn, match the conditions for another production. If a subsequent change to working memory causes the first match to become invalid, it may be that this implies that the second match is also invalid. The Rete algorithm does not define any mechanism to define and handle these logical truth dependencies automatically. Some engines, however, support additional functionality in which truth dependencies can be automatically maintained. In this case, the retraction of one WME may lead to the automatic retraction of additional WMEs in order to maintain logical truth assertions.

"The Rete algorithm does not define any approach to justification. Justification refers to mechanisms commonly required in expert and decision systems in which, at its simplest, the system reports each of the inner decisions used to reach some final conclusion. For example, an expert system might justify a conclusion that an animal is an elephant by reporting that it is large, grey, has big ears, a trunk and tusks. Some engines provide built-in justification systems in conjunction with their implementation of the Rete algorithm.

" . . . Engines may provide specialised support within the Rete network in order to apply pattern-matching rule processing to specific data types and sources such as programmatic objects, XML data or relational data tables. Another example concerns additional time-stamping facilities provided by many engines for each WME entering a Rete network, and the use of these time-stamps in conjunction with conflict resolution strategies. Engines exhibit significant variation in the way they allow programmatic access to the engine and its working memory, and may extend the basic Rete model to support forms of parallel and distributed processing.

" . . . The Rete algorithm is orientated to scenarios where forward chaining and "inferencing" is used to compute new facts from existing facts, or to filter and discard facts in order to arrive at some conclusion."

The disclosures of all publications and patent documents mentioned in the specification and of the publications and patent documents cited therein directly or indirectly are hereby incorporated by reference. Materiality of such publications and patent documents to patentability is not conceded

SUMMARY OF CERTAIN EMBODIMENTS

Certain embodiments of the present invention seek to provide apparatus for conducting dialog between a human user and a computerized system which combines prediction, NLP and backward chaining technologies thereby to enhance efficacy and/or quality of user experience.

According to one embodiment, an Intent Scoring Method and system are provided, for predicting priority events and topics when a user is approaching a virtual agent/robot.

The system deploys a prediction model which uses key indicators derived from analysis of multiple dimensions of historical activity. Dimensions of analyzed activity may include some or all of:

a. Customer's historical transactions, e.g. credit card transactions, vis á vis computerized enterprise
b. Customer's billing status
c. Customer's historical interactions with the system of the present invention
d. Historical interactions regarding the merchant
e. Date and Time Typically, the model generates a list of topics or events which the customer is likely to raise and estimates the probability/likelihood that each topic is relevant in the current situation given some or all of the indicators derived as above. The list of topics and the probability estimations are then used in the following 2 major phases of the session process:

a. generation of priority topics for prompting the customer before he inputs his request; and
b. generation of a combined score which includes the input of the customer for improving the accuracy of a text retrieval system.

Typically, the system generates priority topics for prompting the customer even before s/he puts in any request. A combined score is generated e.g. as per FIG. 5. Typically, the combined score includes or reflects the input of the customer for improving the accuracy of a text retrieval system. Typically, text is initially retrieved from the end user as a reply to the question "how can I help you"; whereas later in the dialog the end user is free to enter any text to direct the next step in dialog Certain conventional expert systems are reactive in that they require facts and specific user requests to start their operation. In business fields such as customer service and marketing, a more proactive approach is desirable.

Certain embodiments of the present invention seek to use a computerized enterprise's knowledge of the user and his problems in order to direct the conversation in a way that will meet their business goals and policies.

Certain embodiments of the present invention seek to enhance user experience by departing from the approach of traditional expert systems which force users to phrase their goals and requests before problem solving begins. In many cases users have limited knowledge of system capabilities, making the goal-setting task difficult and irritating. Users face even more difficulty when natural language input is used as they try to articulate their requests in clear and detailed spoken language.

According to certain embodiments, prediction blocks generate relevance score vectors for potential discussion topics. Typically, prediction blocks make use of both domain data, e.g. a computerized entity's data about a user, and dialogue history for the creation of prediction results, typically as per the method of FIG. 3.

According to certain embodiments, Topic Closure Relevance Scoring is provided e.g. by prediction blocks which assign relevance to complete topic closures. The term "Topic closures" refers to a discussion topic that may include references to open variables that do not have concrete values as part of the topic definition, together with additional information that binds concrete values to these open variables. including bound variable values. The prediction may assign different relevance scores to "how much do I spend on Books" and "how much do I spend on Restaurants" e.g. by creating two closures to the topic "how much do I spend on X", one binding the value "Books" to the open variable X and the other binding the value "Restaurants" e.g. as described herein with reference to FIGS. 2a, 2b.

NLP Relevance Enhancement—Prediction vectors whose data structure may be as shown in FIG. 2b, enhance understanding accuracy by modifying the probabilities assigned by statistical NLP to strengthen likely topics and weaken unlikely topics e.g. as shown in FIG. 7 and FIG. 5.

Mid-Dialogue Fork Prediction Enhancement—Prediction vectors may be employed to enhance the accuracy of mid-dialogue fork prediction algorithms, e.g. as described herein with reference to FIGS. 8-10, e.g. by modifying the probabilities assigned by a fork prediction process, e.g. as shown in FIG. 9 steps (iii) and (v), to strengthen likely topics and weaken unlikely topics.

Problem aware service dialogs: Using suitable data analysis e.g. as per FIG. 3, the system typically predicts the issues that may interest the customer before dialogue begins and typically presents these topics when it first engages the customer. For example, when a customer starts a dialogue, the systems may notice that he recently made a purchase request that was rejected. In this case the system may start the dialogue by asking: "Are you contacting us about a recently rejected purchase request?". The algorithm shown in FIG. 3 may use deduction rules (iv) to: go over user transaction data gathered during the reasoning process (i), identify a rejected transaction, create an appropriate prediction entry for the topic "RejectedTransaction" (vi) and give the prediction entry a high relevance score (vi). FIG. 3 is an example method for effecting prediction scoring, and as described herein, prediction scores may be used to present multiple-choice dialogs.

Dialogs about broad domain contexts: When a customer contacts the system in a broad domain context such as on a general web site home page, without focusing on a specific entity or issue such as a specific financial transaction, the system may use intent scoring e.g. as per the method of FIG. 7, to go over all available data, to score possible discussion topics and to focus the dialog on topics having the most potential to engage the customer. In this way the system can avoid the long menus and option lists that occur in conventional Wizards and IVR systems.

Superior natural language processing: Intent scoring e.g. as per the method of FIG. 7, is useful in the context of natural language user input because standard dialogue systems use statistical natural language processing to analyze the probability that the user's input text refers to each available topic. However, probability scores may depend on more than user input only. According to certain embodiments, business data and dialogue context of the discussion are taken into consideration For example, available business data may show that the user seems to have a duplicate charge at Amazon This data is taken into consideration e.g. by computing the final probability of a topic by combining NLP-probability and prediction relevance scores e.g. as described below with reference to FIG. 5. In this way embarrassing errors of irrelevant NLP understanding" can be avoided, and solutions to NLP ambiguities can be achieved. For example, if the user says "Amazon charged me twice" and a voice to text recognition system converts the voice input to the text "???zon charged me twice", prediction may enable the virtual agent to focus on the correct Amazon transaction and avoid ambiguity with transactions involving Verizon.

The user experience of pure NLP-based dialogue systems for novice users is problematic. Users are faced with empty text boxes and are expected to phrase their requests from scratch with no help or guidance. To alleviate this problem, dialogue systems may provide some kind of guidance for the user on what he can ask and how to phrase his requests. According to certain embodiments, intent scoring, e.g. as per FIG. 3 herein, is used to provide relevant information for automatic construction of such guides e.g. as per step (v) of FIG. 7. Susie, this would be simple for an ordinary programmer to fill in.

Superior mid-dialogue fork prediction: Using intent scoring, e.g. as per FIGS. 3 and 8 herein, for context reinforcing can be applied not only to NLP predictions but also to mid-dialogue fork prediction. A Fork prediction process e.g. as shown in FIG. 9 generate a relevance vector for available fork-topics. An example of a relevant NLP vector is shown in 3401 in FIG. 5. Adjusting the fork-relevance vector, e.g. as described below with reference to FIG. 5, produces improved predictions, for use in both multiple-choice interfaces (such as but not limited to yes/no radio button selection) and natural-language based user interface (such as but not limited to open input text box prompts).

Intent scoring functionality, e.g. as per FIG. 7, may be added to existing dialogue systems. Prediction block technique implemented e.g. as per FIG. 3, and/or score adjusting techniques e.g. as described below with reference to FIG. 5, may be employed.

In accordance with an aspect of the presently disclosed subject matter, there is provided a computerized method for assigning relative scores to various possible intents on the part of a user approaching a virtual agent, the method comprising: employing a processor for predicting priority topics, including gathering first data and employing the first data to discern and seek user confirmation of at least one possible intent on the part of the user; and subsequent to receipt of the confirmation, employing a processor for gathering second data and employing the second data to provide service to the user to suit the user's confirmed intent.

In accordance with an embodiment of the presently disclosed subject matter, there is provided a method wherein the predicting employs a prediction model to generate, from the first data, a list of topics which the customer is likely to raise.

In accordance with an embodiment of the presently disclosed subject matter, there is further provided a method wherein the first data comprises historical information regarding transactional activities involving at least the user.

In accordance with an embodiment of the presently disclosed subject matter, there is yet further provided a method wherein the system is operative to prompt at least one user from among a population of users by presenting, and seeking user confirmation, of at least one possible intent before the user has presented any request.

In accordance with an embodiment of the presently disclosed subject matter, there is yet further provided a method wherein the system generates a combined score which includes the input of the user for improving the accuracy of a text retrieval system. Typically, at each step in the dialog the user provides input e.g. as voice and/or typed text. Voice input may be converted to text using systems such as but not limited to the open source CMU Sphinx—Speech Recognition Toolkit and speech to text services such as those provided by Nuance Dragon products and Google Chrome voice search functionality.

In accordance with an embodiment of the presently disclosed subject matter, there is yet further provided a method wherein the activities comprise at least one credit card transaction.

In accordance with an embodiment of the presently disclosed subject matter, there is yet further provided a method wherein the historical information comprises billing information.

In accordance with an embodiment of the presently disclosed subject matter, there is yet further provided a method wherein the user is also a user of a computerized enterprise and wherein the first data includes enterprise data obtained from the enterprise which establishes a business, data and dialogue context for dialogue with the user.

In accordance with an embodiment of the presently disclosed subject matter, there is yet further provided a method also comprising using a result of the predicting to automatically construct a guide for the user on how to phrase requests, in contrast to conventionally pure NLP-based dialogue systems in which users are provided with empty text boxes and are expected to phrase their requests without guidance.

In accordance with an embodiment of the presently disclosed subject matter, there is yet further provided a method wherein the predicting uses executable code having forward-chaining rule-based deduction logic.

In accordance with an embodiment of the presently disclosed subject matter, there is yet further provided a method wherein the using comprises presenting a multiple-choice selection to the user including a plurality of options for selection wherein each option suggests a specific topic closure as a next step in a dialogue with the user.

In accordance with an embodiment of the presently disclosed subject matter, there is yet further provided a method wherein relevance scores generated by the predicting are used to sort selection options such that highest relevance are on top.

In accordance with an embodiment of the presently disclosed subject matter, there is yet further provided a method wherein conventional variable binding techniques may be used to automatically generate appropriate natural language names for topic closures.

In accordance with an aspect of the presently disclosed subject matter, there is provided a system for assigning relative scores to various possible intents on the part of a user approaching a virtual agent, the system comprising: a dialogue topic predictor operative for predicting priority topics, including gathering first data and employing the first data to discern and seek user confirmation of at least one possible intent on the part of the user; and a dialogue generator operative, subsequent to receipt of the confirmation, for gathering second data and employing the second data to provide dialogue with a user to suit the user's confirmed intent.

In accordance with an aspect of the presently disclosed subject matter, there is provided a computer program product, comprising a non-transitory tangible computer-readable medium having computer-readable program code embodied therein, the computer-readable program code adapted to be executed to implement a method for assigning relative scores to various possible intents on the part of a user approaching a virtual agent, the method comprising: predicting priority topics, including gathering first data and employing the first data to discern and seek user confirmation of at least one possible intent on the part of the user; and subsequent to receipt of the confirmation, gathering second data and employing the second data to provide service to the user to suit the user's confirmed intent.

Also provided, excluding signals, is a computer program comprising computer program code means for performing any of the methods shown and described herein when said program is run on a computer; and a computer program product, comprising a typically non-transitory computer-usable or -readable medium, e.g. non-transitory computer-usable or -readable storage medium, typically tangible, having a computer-readable program code embodied therein, said computer-readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer-readable storage medium.

Any suitable processor, display and input means may be used to process, display, e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CD-ROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine-readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, terms such as "processing", "computing", "estimating", "selecting", "ranking", "grading", "calculating", "determining", "generating", "reassessing", "classifying", "producing", "stereo-matching", "registering", "detecting", "associating", "superimposing", "obtaining" or the like refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer-readable medium and executable by at least one processor, or any suitable combination thereof. A specific functional component may be formed by one particular sequence of software code, or by a plurality of such, which collectively act or behave as described herein with reference to the functional component in question. For example, the component may be distributed over several code sequences such as but not limited to objects, procedures, functions, routines and programs and may originate from several computer files which typically operate synergistically.

Data can be stored on one or more tangible or intangible computer-readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

According to certain embodiments, an executable reasoning block may be employed in conjunction with existing reasoning functionalities of a hosting dialogue system. An "executable reasoning block" typically comprises executable computer code, such as but not limited to Java code, rule base, or python script code, used to resolve a reasoning item. A "reasoning item" is an atomic data processing unit for a reasoning algorithm, which when resolved may present an interactive dialog to the user, perform computations, query information from external systems or execute actions on external data systems.

Figure 2A:
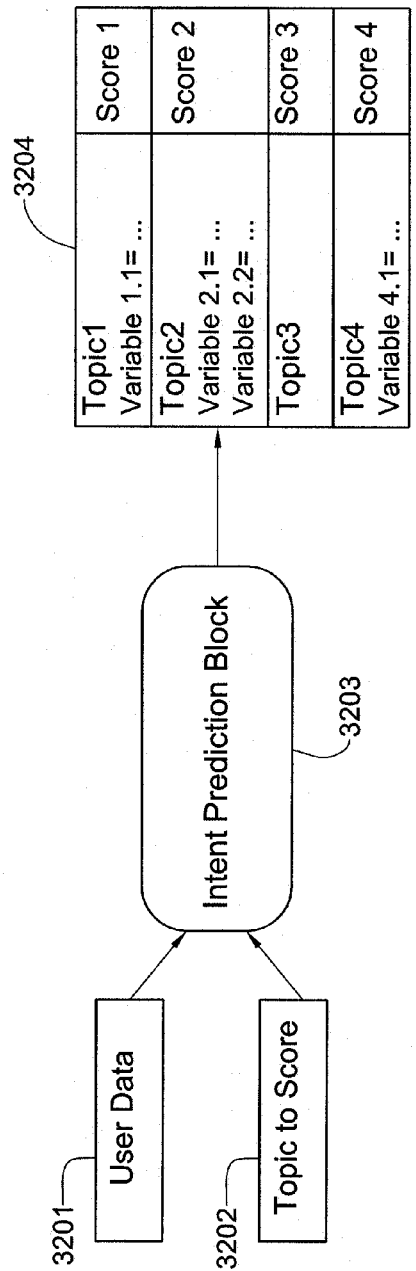
FIG. 2a is a simplified diagram of inputs and outputs to an Intent Prediction Block Functionality constructed and operative in accordance with certain embodiments.
Figure 3:
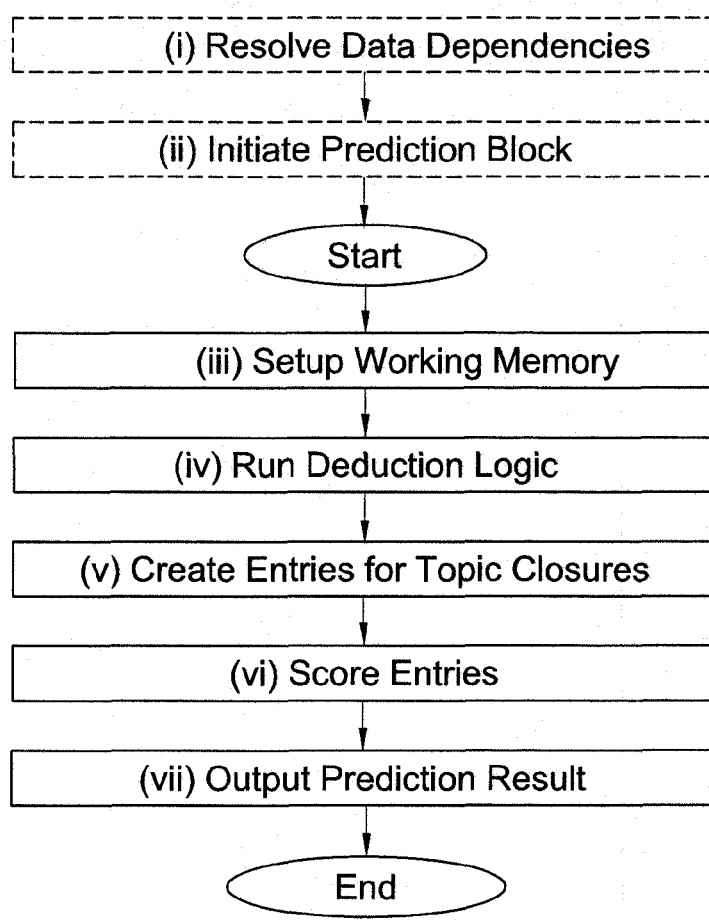
FIG. 3 is a simplified flowchart illustration of an Intent Prediction method constructed and operative in accordance with certain embodiments.

FIG. 2a presents functionality of a prediction block e.g. as per the Intent Prediction method of FIG. 3. As shown, the block typically accepts two categories of inputs and, as shown in FIG. 3, inserts the input categories into working memory and uses forward chaining to reason over them and create results, e.g. as described in the Wikipedia entry for Drools and the references and links cited therein. The first category includes user data (3201) such as historical financial transaction from a computerized enterprise such as but not limited to a computerized banking system, which may for example be collected at runtime using the host reasoning framework. The second category includes configuration data indicating topics the block is to consider and score (3202).

Intent prediction blocks may include executable code that reasons over user data to assign extended context and relevance scores to certain typically pre-selected topics. (3203) The topics may be pre-selected by business domain logic embedded in prediction rules. In one embodiment, executable code may include forward-chaining rule-based deduction functionality.

Figure 2B:
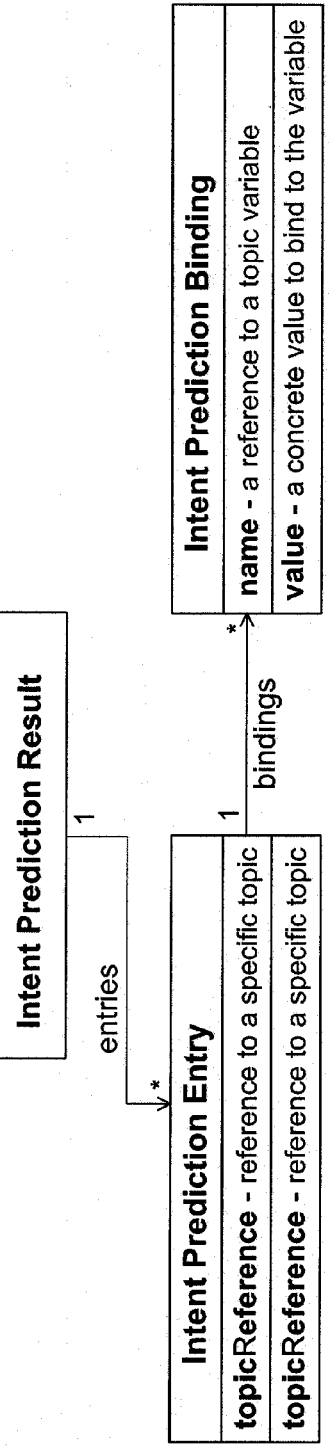
FIG. 2b is a diagram of an example data structure for a Prediction Result constructed and operative in accordance with certain embodiments.

The output of intent prediction blocks (3204) may have the data structure presented in FIG. 2b. An intent prediction result may include one or a plurality of intent prediction entries. Each entry may include a topic reference, a relevance score and a plurality of intent prediction bindings. Bindings can: 1) be set manually or 2) generated by Rete rules which identify patterns in the Cartesian multiplication of (topic from topic ontology) X (relevant data for an open variable from external bank system).

Example: the topic "how much do I spend on X" may be multiplied by the data ("Books","Sports","Restaurants") as collected from the business sectors of the user's last three financial transactions, to produce three topic closures.

It is appreciated that Rete-based prediction constitutes only one possible embodiment. Alternatively, any other implementation for prediction may be employed, such as but not limited to Java-code, Prolog code, Lisp code, decision tables, decisiontrees, truth tables or state charts.

Bindings allow the entry to represent a closure that binds a topic with specific values for its open parameters. For example, binding the single topic "TSpending" with the values "Restaurants" and "Toys" may create two distinct topic closures: "How much do I spend on Restaurants" and "How much do I spend on Toys", e.g. as per reference numeral 3402 in FIG. 5.

As illustrated in steps i-vii in FIG. 3, the execution of intent prediction blocks may include some or all of the following steps, suitably ordered e.g. as shown.

Prediction flow typically occurs in the context of a hosting dialogue system that resolves external data dependencies (step i) and initiates or evaluates the prediction block (step ii).

In one embodiment, the prediction flow may include forward-chaining rule-based deduction. In step iii, the prediction block first transforms its inputs into a flat working memory structure as is known in the art of Rete algorithms such as in the Drools open source implementation. The flat working memory structure is used by the Rete pattern matching algorithm. In step iv, the block runs the Rete algorithm to execute deduction logic using "IF-THEN" rules. Rules execute code defined in their "THEN" section when data patterns defined in their "IF" section are identified in the working memory. Rules use the executable code in their "THEN" section to create intent prediction entries, whose structure may for example be that described above with reference to FIG. 2b, for predicted topic closure (step v). The relevance of the intent prediction entries is typically scored (step vi) e.g. the score may be programmatically set by the rule's THEN code. Finally, the block collects all entries to produce (step vii) a single intent prediction result whose structure may for example be that described above with reference to FIG. 2b.

Intent prediction results may be used to present multiple-choice selection dialogs to the user. Each selection option suggests a specific topic closure as a next step in the dialogue. In this embodiment, relevance scores, e.g. as generated in step vi of FIG. 3, are used to sort selection options (highest relevance on top), while conventional variable binding techniques may be used to generate appropriate natural names for topic closures such as "How much do I spend on Restaurants". —In one embodiment a text template of the form "How much do I spend on <var name='businessField'/>" may be used in conjunction with the value binding "Rsetaurants" for the open variable "businessField" to generate the topic's natural name "How much do I spend on Restaurants" by replacing the <var name='businessField'/> tag with the string "Restaurants".

Figure 4:
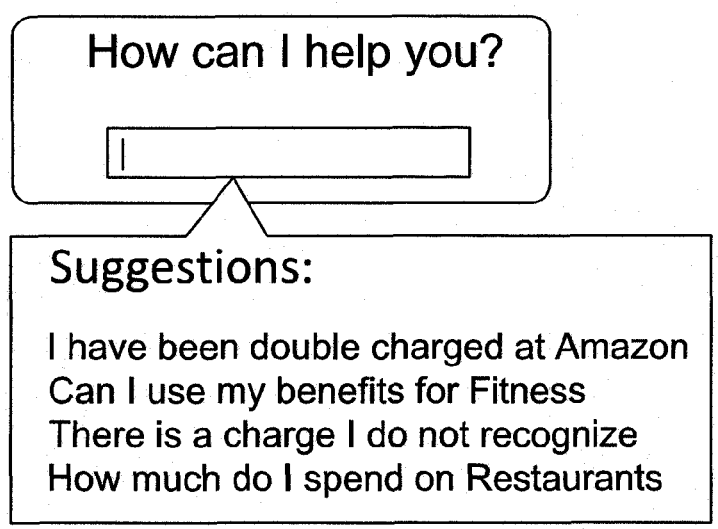
FIG. 4 is a diagram of an Enhanced Natural Language User Interface constructed and operative in accordance with certain embodiments.

Enhanced natural language processing: Intent prediction results e.g. as generated by the method of FIG. 3 may also be employed for elicitation and processing of open-ended natural language user input. In one embodiment, an open-ended input box may be presented to the user as illustrated in FIG. 4. Prediction results, e.g. as generated by the method of FIG. 3, may be used (step (v) of FIG. 7) to enhance the input box with an intelligent guide with relevant suggestions including relevant typing suggestions for the user e.g. as described herein with reference to FIGS. 4-5. The user may click one of the suggestions to insert that suggestion's text into the input box, thus gaining quick access to the most relevant topics and avoiding time-consuming typing. Typically, the user may click one of the suggestions, insert its text in the input box and edit the text according to his needs before submitting it to the system. In this way, intent scoring creates a new user experience that combines the rapidity of multiple selection interfaces with the open-endedness of natural language dialogue.

Figure 5:
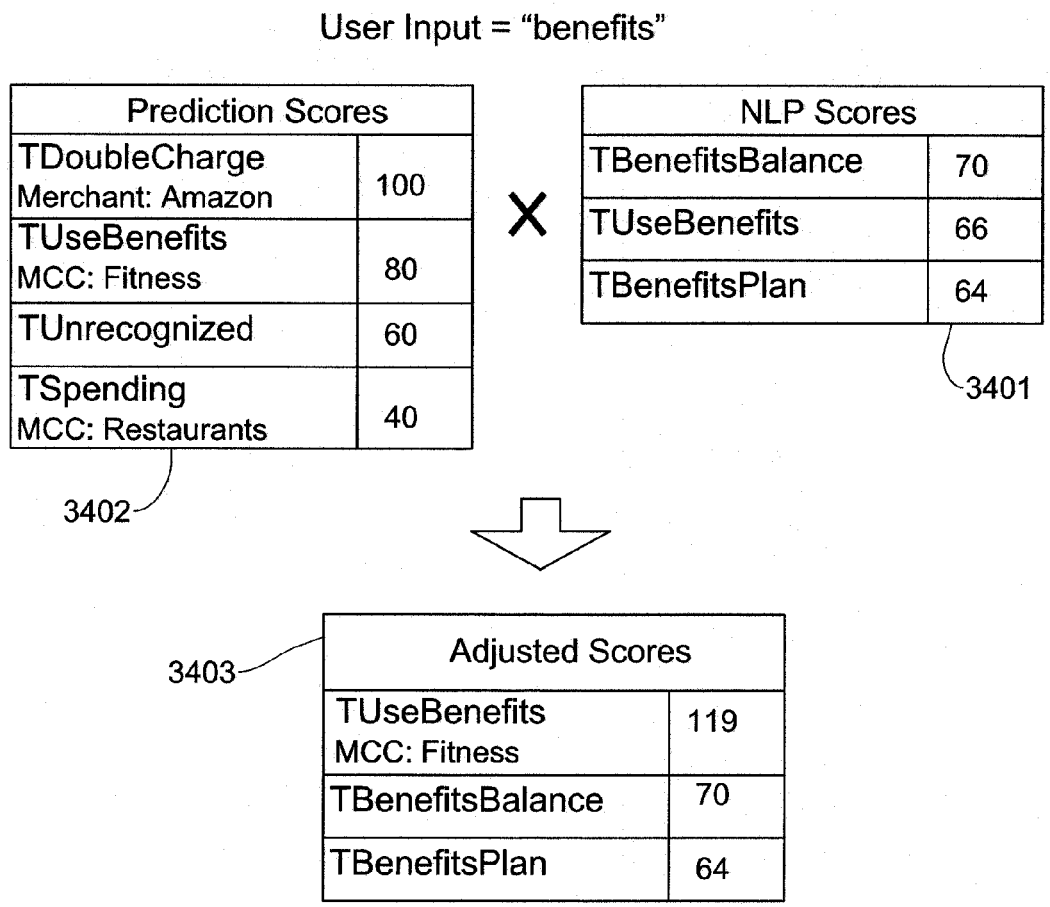
FIG. 5 is a diagram of an NLP score adjustment functionality constructed and operative in accordance with certain embodiments.

After the user inputs her or his natural language text, prediction results may be employed to enhance NLP results, e.g. as illustrated in FIG. 5. Statistical NLP systems analyze user text input and generate a result vector that indicates the probability that the text relates to each of the possible discussion topics (3401).

According to certain embodiments, prediction scores (3402) which may be generated as per the method of FIG. 5, are applied to enhance NLP results and generate an adjusted result vector (3403). In one embodiment, simple multiplication of topic scores may be applied to compute adjusted scores. Alternatively, more advanced transformations may be used to compute NLP and prediction scores of a topic so as to generate an adjusted score for the topic.

Figure 1A:
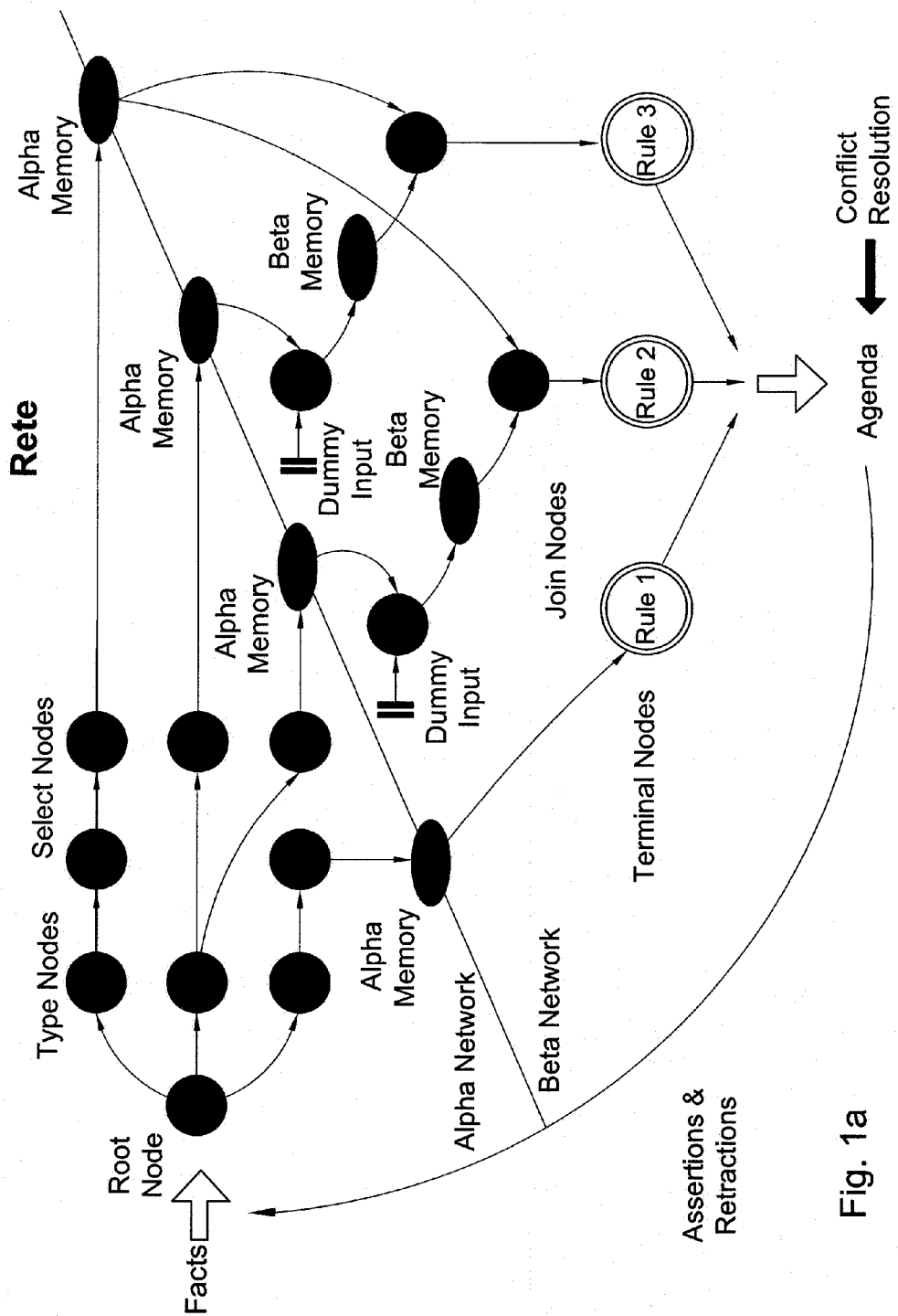
FIG. 1a is a diagram useful in understanding the conventional Rete algorithm which is useful in implementing the methods and systems shown and described herein.
Figure 1B:
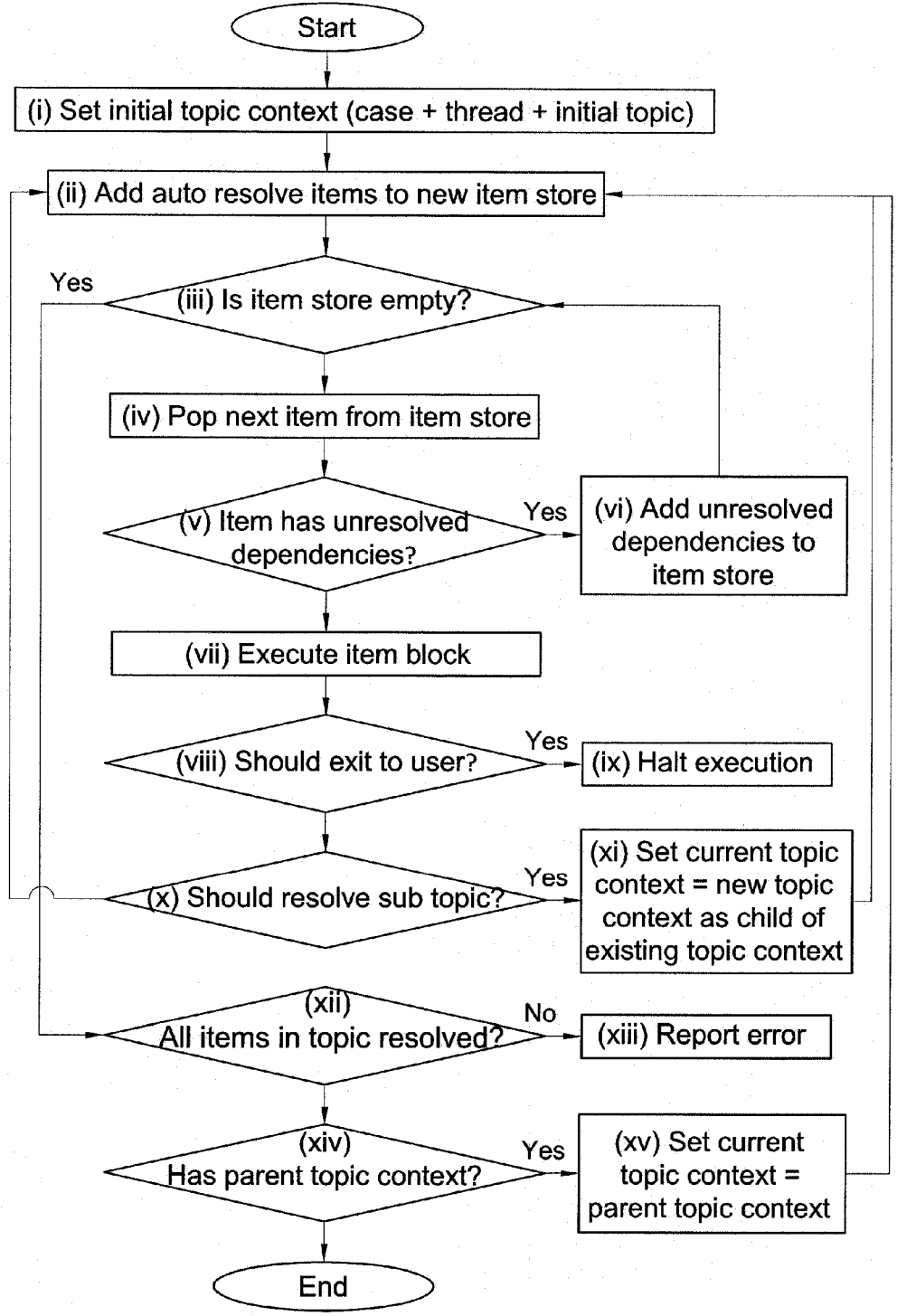
FIG. 1b is a simplified flowchart illustration of a computerized reasoning method constructed and operative in accordance with certain embodiments.

Enhanced mid-dialogue fork prediction: A method for improving handling of mid-dialogue forks is now described. In mid-dialogue fork prediction, e.g. as described herein with reference to FIGS. 8-10, a hosting dialog system may create a runtime topic-context tree e.g. as per FIG. 1b and apply a fork prediction technique to predict the possibility and likelihood that the user may wish to steer the conversation to each of various possible forks typically including some or all of discussion of the same topic about a different entity, discussion of another topic on the same entity, switching between discussion sub-threads, and possibly more.

The context tree is used to identify all topics and entities that occurred in the discussion up to the current discussion state and their relevance for the current context (greater distance in the tree→less relevance). For each discussed topic and entity, meta-data is used to find relevant fork-topics and assign a probability score to each fork. The system may compute the prediction value for each fork-topic as max (context-relevance X fork-probability).

Figures 9, 10:
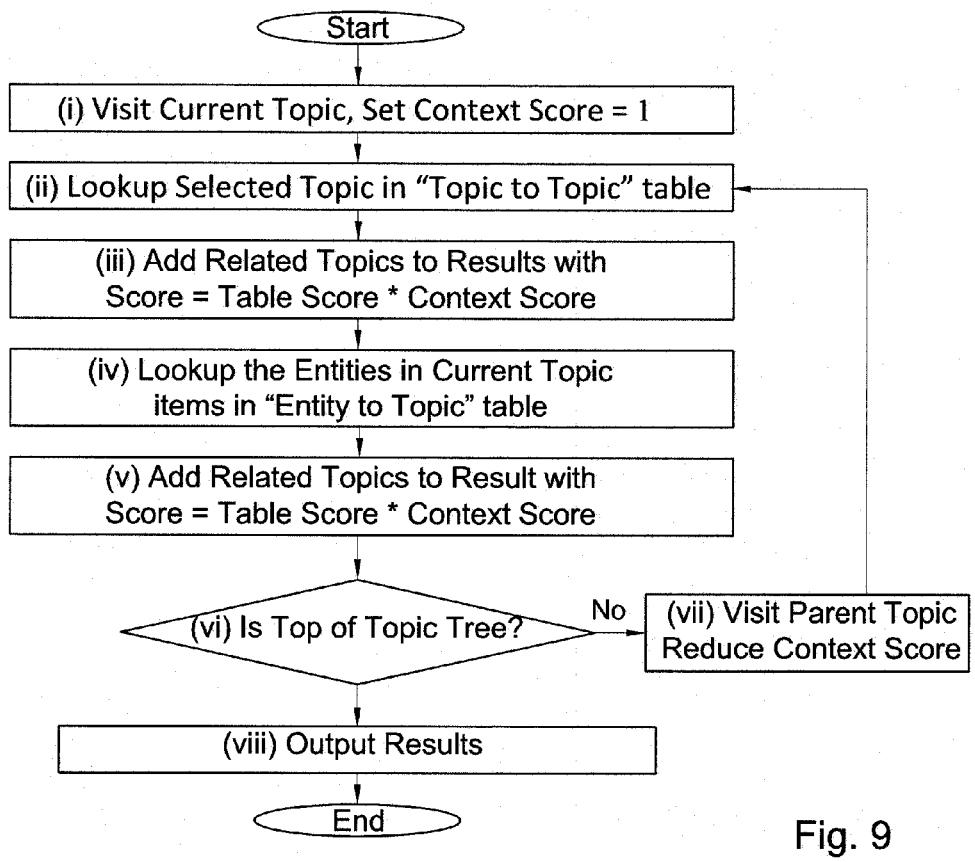

Fork prediction generates a vector of possible forking topics and assigns a probability score to each one. Applying prediction scores to enhance fork handling, e.g. as per FIG. 7, helps the system give users quick access to probable forks and achieve better understanding of open-ended fork-related natural language input (step (ii) in FIG. 7; FIG. 9).

Figure 6:
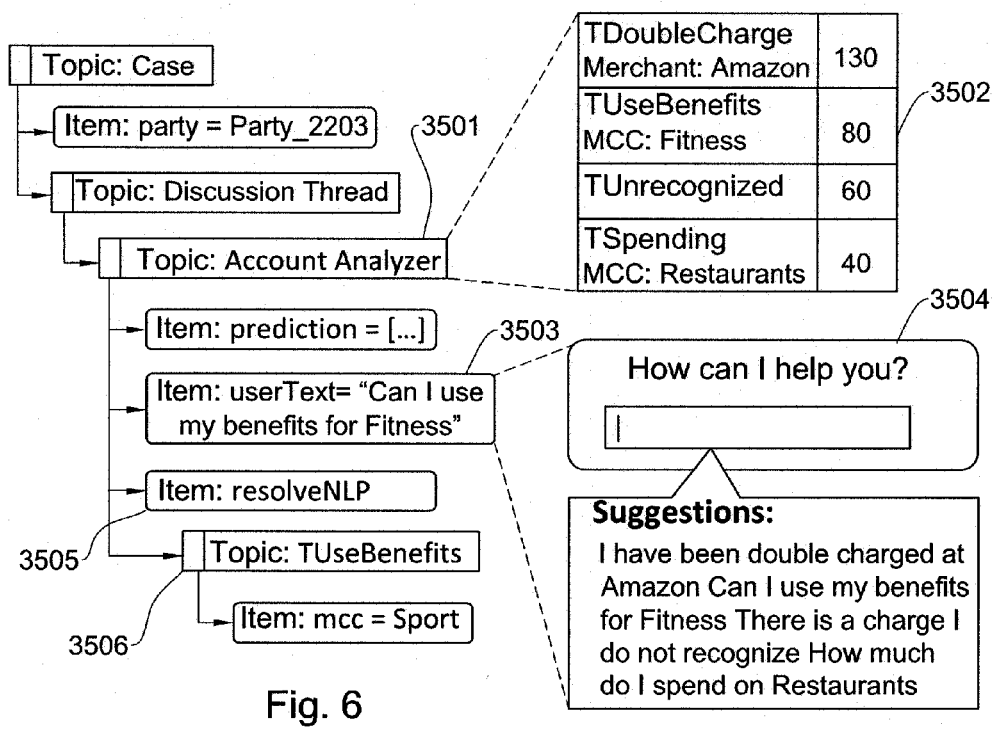
FIG. 6 is a diagram of an example of Intent Scoring which may be performed by the method of FIGS. 3 and 7, in accordance with certain embodiments.

For example, FIG. 6 illustrates an integrated implementation of intent scoring in the context of a dialogue system: Intent prediction starts when the host system resolves an item that uses the intent prediction block (3501). Executing the block uses available user data to produce an intent prediction result, assigning relevance scores to significant topic closures (3502). Prediction results are used in a subsequent item (3503) to display a guided natural language dialogue interface to elicit user text input (3504). In the following items, prediction scores are used to enhance NLP results (3505) and select the most suitable topic as the next focus for discussion (3506).

Figure 7:
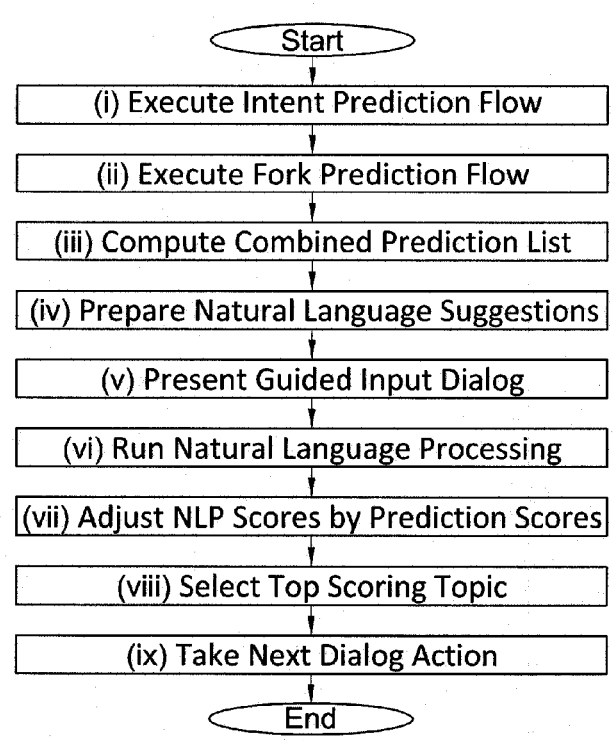
FIG. 7 is a simplified flowchart illustration of an Intent scoring method constructed and operative in accordance with certain embodiments, including an intent prediction step which may for example be performed using the method of FIG. 3 and a fork prediction step which may for example be performed using the method of FIG. 9.

FIG. 7 is a simplified flowchart illustration of an Intent scoring method constructed and operative in accordance with certain embodiments. The method of FIG. 7 includes some or all of the illustrate steps (a)-(i), suitably ordered e.g. as shown. It is appreciated that a suitable method of implementing intent prediction step (a) is as per the intent prediction step of FIG. 3.

Figure 8:
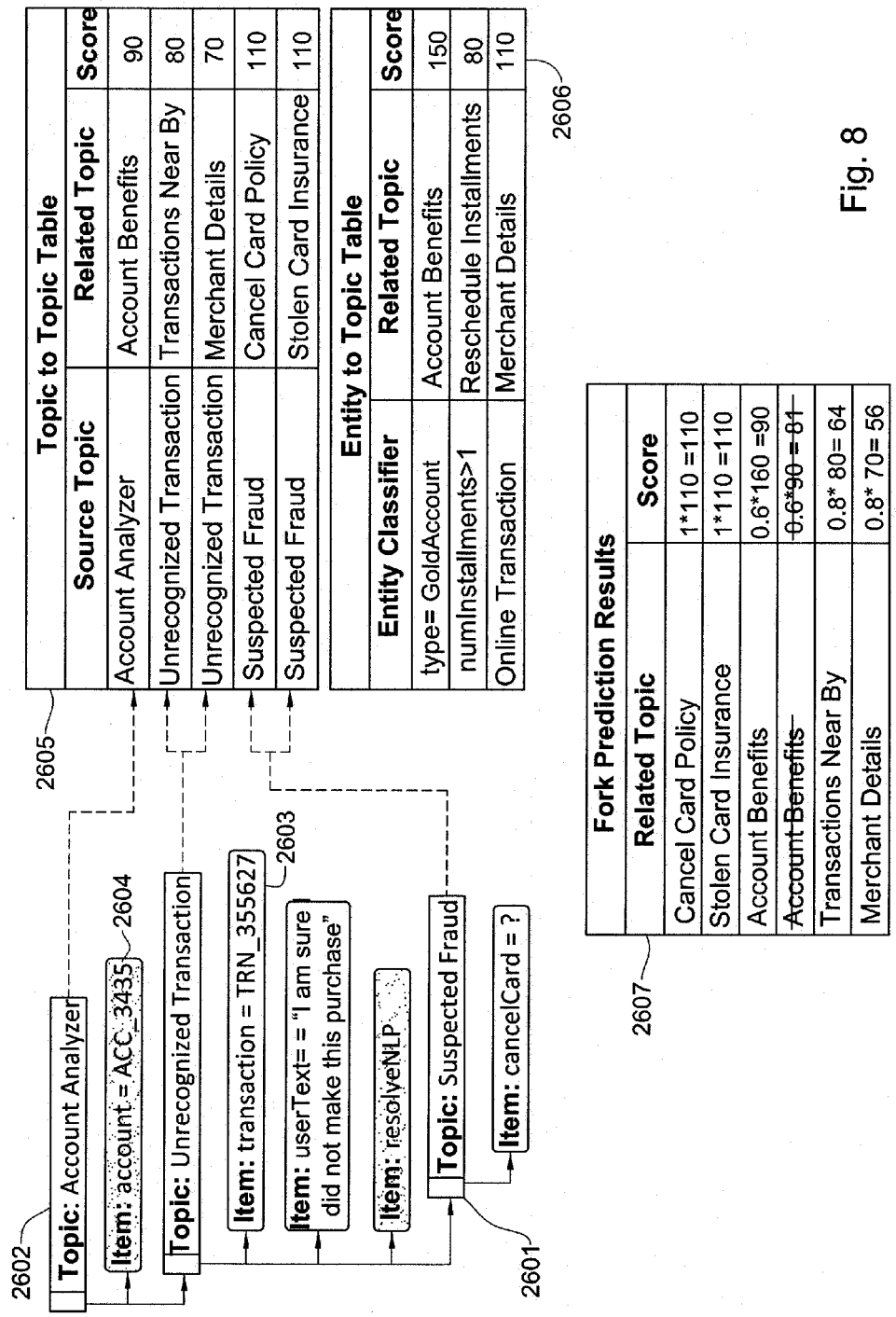
FIGS. 8-10 are an example diagram, flowchart and table respectively useful in understanding methods for mid-dialog fork prediction constructed and operative in accordance with certain embodiments of the present inventions.

Methods for mid-dialog fork prediction according to certain embodiments, which are useful e.g. for implementing step b of the method of FIG. 7, are now described in detail with reference to FIGS. 8-10. Generally, human dialog is a multi-step process where each step creates a new context for understanding. Throughout a conversation a customer or user often desires to steer discussion to one of several possible forks, such as but not limited to some or all of:
discussion of the same topic about a different entity
discussion of another topic on the same entity
switching between discussion sub-threads
and more.

A runtime topic-context tree created by the reasoning process shown and described herein is a powerful tool for predicting the possibility and likelihood of such context switches.

A fork prediction process may include some or all of the steps illustrated in FIG. 10, suitably ordered e.g. as shown. Fork prediction typically starts from the currently discussed topic at the bottom of the topic context tree (step i) and climbs to the root of the tree while visiting each nested topic on its way (steps vi, vii). The process assigns the bottom topic a maximum context score of 1, giving each topic a smaller context score as the process moves up the tree.

For each visited topic, the process may employ a "Topic to Topic" table, e.g. as illustrated in FIG. 10 (2501), to map the visited topic to a collection of related topics assigning each one a relevance score (step ii). The process adds the related topics to its results, computing the relevance score for each topic as the multiplication of their relevance score and the current context score (step iii).

For each reasoning item in the visited topic, the process checks if the item refers to a business entity such as a bank account or a financial transaction. If a business entity is identified the process uses the "Entity to Topic" table, e.g. that of FIG. 10 (2502), to map the entity to a collection of relevant topics (step iv). In one embodiment expressions are used to check the relevance of the entity to the topics e.g. is the entity's type equal to "GoldAccount". In another embodiment named classes can be used for relevance checks e.g. is the entity and Online Transaction. In this embodiment the use of the named class is decoupled from the implementation of the class that may use compiled code, expressions, rule based deduction, table based lookups and more.

The process typically adds the identified related topics to its results, computing the relevance score for each topic as the multiplication of their relevance score and the current context score (step v). The process typically terminates when it reaches the top of the topic context tree and returns its results. In a more involved embodiment the process may not limit its search to the currently discussed topic branch (from the current topic to the root), but may instead visit the whole tree representing all previously discussed topics using a suitable tree searching process such as but not limited to DFS or BFS.

FIG. 9 presents an example with three nested topic context nodes and two embedded entities. The process starts from the bottom topic context (2601) and makes its way to the root topic context (2602). The process visits entities (2603) and (2604) en route. The "Topic to Topic" table (2605) and "Entity to Topic" table (2606) are used to map visited topics and entities to related topics and to create a resulting fork prediction vector (2607). It is appreciated that the topic "Account Benefits" is scored twice and thus receives a maximum computed score.

Dialog may be conducted between a server implementing some or all of the functionalities shown and described herein, and a mobile communication device serving a user who is a client for the server and a customer of a computerized enterprise providing data either directly to the server or to the public, such that data may be captured by the server, without cooperation with the enterprise. The term "mobile communication device" as used herein is intended to include but not be limited to any of the following: mobile telephone, smart phone, playstation, iPad, TV, remote desktop computer, game console, tablet, mobile e.g. laptop or other computer terminal, embedded remote unit. The system may be implemented as a web-based system including suitable software, computers, routers and telecommunications equipment.

The methods shown and described herein are particularly useful in serving hundreds, thousands, tens of thousands, or hundreds of thousands of users each generating hundreds or thousands of transactions or more vis á vis the computerized enterprise. This is because practically speaking, such large bodies of knowledge can only be processed for dialog enhancement as described herein using computerized technology.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer-useable medium having computer-readable program code, such as executable code, having embodied therein, and/or including computer-readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client-centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order, may be provided separately or in any suitable subcombination or in a different order. The term "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A computerized method for assigning relative scores to various possible intents on the part of a user approaching a virtual agent, the method comprising:
   employing a processor for predicting priority topics, including gathering first data and employing the first data to discern and seek user confirmation of at least one possible intent on the part of the user; and
   subsequent to receipt of said confirmation, employing a processor for gathering second data and employing the second data to provide service to the user to suit the user's confirmed intent,
   wherein a context tree having nodes is used to identify all topics and entities that occurred in a multi-step dialogue up to a current dialogue state corresponding to a current dialogue step, and their relevance for a current context created by said current dialogue step and wherein relevance between said nodes is related to distance therebetween,
   wherein intent scoring occurs in conjunction with a hosting dialogue system operative to resolve external data dependencies and wherein the hosting dialogue system resolves at least a first item employing available user data to produce an intent prediction result, including assigning relevance scores to significant topic closures and wherein at least said intention prediction result is used in a subsequent item to display a guided natural additional item, prediction scores are used to enhance NLP results and a most suitable topic is selected as a next focus for discussion with said user, and
   wherein dialog is conducted accordingly, with a mobile communication device serving the user.

2. A method according to claim 1 wherein said predicting employs a prediction model to generate, from said first data, a list of topics which the customer is likely to raise.

3. A method according to claim 1 wherein said first data comprises historical information regarding transactional activities involving at least the user.

4. A method according to claim 3 wherein said activities comprise at least one credit card transaction.

5. A method according to claim 3 wherein said historical information comprises billing information.

6. A method according to claim 1 wherein the system is operative to prompt at least one user from among a population of users by presenting, and seeking user confirmation, of at least one possible intent before the user has presented any request.

7. A method according to claim 6 wherein the system generates a combined score which includes user input for improving the accuracy of a text retrieval system.

8. A method according to claim 1 wherein the user is also a user of a computerized enterprise and wherein said first data includes enterprise data obtained from said enterprise which establishes a business, data and dialogue context for dialog with the user.

9. A method according to claim 1 also comprising using a result of said predicting to automatically construct a guide for the user on how to phrase requests, in contrast to conventionally pure NLP-based dialogue systems in which users are provided with empty text boxes and are expected to phrase their requests without guidance.

10. A method according to claim 9 wherein said using comprises presenting a multiple-choice selection to the user including a plurality of options for selection wherein each option suggests a specific topic closure as a next step in a dialogue with the user.

11. A method according to claim 10 wherein relevance scores generated by said predicting are used to sort selection options such that highest relevance are on top.

12. A method according to claim 10 wherein variable binding is used to automatically generate appropriate natural language names for topic closures.

13. A method according to claim 1 wherein said predicting uses executable code having forward-chaining rule-based deduction logic.

14. A method according to claim 7 wherein the user input includes text retrieved from the user as a reply to a "how can I help you"-type question.

15. A method according to claim 14 wherein the user input also includes text entered by the user later in the dialogue to direct a next step in the dialogue.

16. A method according to claim 1 wherein said relevance between said nodes is inversely related to distance therebetween.

17. A method according to claim 1 wherein variable binding is used to automatically generate at least one appropriate natural language name for at least one topic closure.

18. A system for assigning relative scores to various possible intents on the part of a user approaching a virtual agent, the system comprising:
a dialog topic predictor operative for predicting priority topics, including gathering first data and employing the first data to discern and seek user confirmation of at least one possible intent on the part of the user; and
a dialog generator operative, subsequent to receipt of said confirmation, for gathering second data and employing the second data to provide dialog with a user to suit the user's confirmed intent,
wherein at least one predictor vector is employed to increase accuracy of at least one mid-dialogue fork prediction process used to generate a relevance vector for at least one available fork topic, including modifying probabilities assigned by the fork prediction process thereby to generate improved predictions and using said improved predictions for at least one interface.

19. A system according to claim 18 wherein the context tree is operative for predicting possibility and likelihood of at least one context switch.

20. A system according to claim 18 wherein the fork prediction process employs a topic-to-topic table to map a visited topic to related topics and to assign a relevance score to each related topic, wherein said relevance score assigned combines an existing relevance score for the related topic with a current context score.

21. A system according to claim 20 wherein the fork prediction process employs an entity-to-topic table to map an entity to which a reasoning item in a visited topic refers, to relevant topics.

22. A system according to claim 21 wherein the topic-to-topic and entity-to-topic tables are used to map visited topics and entities to related topics and to generate a fork prediction vector accordingly.

23. A system according to claim 18 wherein said at least one interface comprises a natural language based user interface.

24. A computer program product, comprising a non-transitory tangible computer-readable medium having computer-readable program code embodied therein, said computer-readable program code adapted to be executed to implement a method for assigning relative scores to various possible intents on the part of a user approaching a virtual agent, the method comprising:
predicting priority topics, including gathering first data and employing the first data to discern and seek user confirmation of at least one possible intent on the part of the user; and
subsequent to receipt of said confirmation, gathering second data and employing the second data to provide service to the user to suit the user's confirmed intent, wherein a context tree having nodes is used to identify all topics and entities that occurred in a multi-step dialogue up to a current dialogue state corresponding to a current dialogue step, and their relevance for a current context created by said current dialogue step and wherein relevance between said nodes is inversely related to distance therebetween,
wherein variable binding is used to automatically generate at least one appropriate natural language name for at least one topic closure, and
wherein said binding is generated using Rete rules which identify patterns in a Cartesian multiplication between topic from topic ontology and relevant data for an open variable from an external system.

* * * * *

UNITED STATES PATENT AND TRADEMARK OFFICE
CERTIFICATE OF CORRECTION

PATENT NO. : 9,495,962 B2  
APPLICATION NO. : 14/345811  
DATED : November 15, 2016  
INVENTOR(S) : David D. Govrin et al.

Page 1 of 1

It is certified that error appears in the above-identified patent and that said Letters Patent is hereby corrected as shown below:

Claim 1, Line 62 cancel the text beginning with "used in a subsequent item to display a guided natural" and insert --used in a subsequent item to display a guided natural language dialogue interface which elicits user text input and wherein, for at least one--.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*